United States Patent
Teague

(10) Patent No.: US 10,686,832 B2
(45) Date of Patent: Jun. 16, 2020

(54) DYNAMIC ALLOCATION OF A SIGNAL RECEIVER FOR DISSEMINATION OF THREAT INFORMATION

(71) Applicant: Verisign, Inc., Reston, VA (US)

(72) Inventor: Francis Teague, Corbridge (GB)

(73) Assignee: VERISIGN, INC., Reston, VA (US)

( * ) Notice: Subject to any disclaimer, the term of this patent is extended or adjusted under 35 U.S.C. 154(b) by 144 days.

(21) Appl. No.: 15/384,233

(22) Filed: Dec. 19, 2016

(65) Prior Publication Data

US 2018/0176246 A1   Jun. 21, 2018

(51) Int. Cl.
*H04L 29/06* (2006.01)

(52) U.S. Cl.
CPC .................. *H04L 63/1458* (2013.01)

(58) Field of Classification Search
CPC ............... H04L 63/1458; H04L 63/145; H04L 29/06877; H04L 63/14
USPC .......................................................... 726/22
See application file for complete search history.

(56) References Cited

U.S. PATENT DOCUMENTS

| | | | | |
|---|---|---|---|---|
| 8,856,924 | B2 * | 10/2014 | Holloway | H04L 63/1458 726/22 |
| 9,621,577 | B2 * | 4/2017 | Akcin | H04L 63/1441 |
| 9,769,202 | B2 * | 9/2017 | Smith | H04L 63/20 |
| 2002/0199000 | A1 * | 12/2002 | Banerjee | H04L 29/06 709/227 |
| 2005/0267941 | A1 * | 12/2005 | Addante | G06Q 10/107 709/206 |
| 2013/0055374 | A1 * | 2/2013 | Kustarz | H04L 63/1408 726/13 |
| 2015/0180748 | A1 * | 6/2015 | Ding | H04L 41/046 709/224 |
| 2016/0080412 | A1 | 3/2016 | Smith et al. | |
| 2016/0261628 | A1 * | 9/2016 | Doron | H04L 63/1458 |

OTHER PUBLICATIONS

Forouzan, "Data Communications and Networking", 2007, McGraw-Hill Companies. Inc, Fourth Edition,703-759 (Year: 2007).*
Extended European Search Report for Application No. 17207297.7 dated May 14, 2018.
Teague, N. Open Threat Signaling Using RPC API over HTTPS and IPFIX draft-teague-open-threat-signaling-00, Verisign Inc., Jan. 14, 2015 (16 pages).

* cited by examiner

*Primary Examiner* — Ali S Abyaneh
(74) *Attorney, Agent, or Firm* — Artegis Law Group, LLP

(57) ABSTRACT

Various embodiments of the invention disclosed herein provide techniques for dynamically assigning a signaling server for threat mitigation. A DDoS detection server transmits a first message to a first signaling server requesting first configuration data. The DDoS detection server receives a second message from the first signaling server that includes first configuration data identifying a second signaling server. The DDoS detection server determines that a distributed denial of service (DDoS) attack is in progress. The DDoS detection server, in response to determines that a DDoS attack is in progress, transmitting a third message to the second signaling server requesting mitigation of the DDoS attack.

19 Claims, 5 Drawing Sheets

DYNAMIC ALLOCATION OF A SIGNAL RECEIVER FOR DISSEMINATION OF THREAT INFORMATION

BACKGROUND OF THE INVENTION

Field of the Invention

The present invention relates generally to computer network security and, more specifically, to dynamic allocation of a signal receiver for dissemination of threat information.

Description of the Related Art

In the domain of computer network security, computer systems that present websites and other content to a public network, such as the internet, are vulnerable to various types of attacks from malicious users. One well-known type of attack is a distributed denial of service (DDoS) attack. In a DDoS attack, a large number of network-connected devices attempt to overwhelm a targeted computer system by flooding the targeted computer system with a large volume of network traffic, such as requests for particular webpages or other content. As the targeted computer system attempts to process and respond to the increased volume of network traffic, the targeted computer system is no longer able to receive and process legitimate network traffic. As a result, non-malicious network-connected devices are unable to access content from the targeted computer system, thereby resulting in a denial of service.

To mitigate the effects of DDoS attacks, owners of computer systems can enroll in DDoS protection services provided by third-party companies. In general, a DDoS protection service consists of one or more servers configured to reduce or eliminate the impact of a DDoS attack on one or more computer system. When a targeted computer system notifies the DDoS protection services that a DDoS attack is in progress, the DDoS protection service diverts network traffic away from the targeted computer system and toward one or more servers associated with the DDoS protection services. Based on various parameters and analysis, these servers determine which portion of the network traffic is being received from legitimate client devices and which portion of the network traffic is associated with the DDoS attack. Network traffic determined to be received from legitimate client devices is forwarded by the DDoS protection service to the targeted system. Network traffic determined to be associated with the DDoS attack is discarded.

During provisioning and configuration of such DDoS protection services, a router associated with the computer system is statically assigned to a network address, such as an IP address, of a router associated with a DDoS mitigation server. Under normal conditions, a router associated with a computer system that hosts websites and other content advertises a route to the internet. The router advertises the route in response to a change to the router configuration made by a system administrator. By advertising a route, the router notifies all network-connected devices that the websites and content are accessible, or reachable, via a particular internet protocol (IP) address or set of IP addresses associated with the computer system.

In the case of a DDoS attack, the targeted computer system observes a significant increase in network traffic directed to the targeted computer system. In one approach, the router associated with the targeted computer system withdraws the previously advertised route. Further, the router associated with the targeted computer system transmits a message to the statically assigned DDoS mitigation server, where the message indicates that the computer system is undergoing a DDoS attack. This approach of transmitting a message to the statically assigned DDoS mitigation server is referred to herein as "cloud signaling." In response, a router for the DDoS protection services company advertises a new route associated with the content on the targeted computer system. The new route causes requests formerly directed to the targeted computer system to be directed to the DDoS mitigation server at the DDoS protection service company.

Through various analyses and procedures, the DDoS mitigation server determines which network traffic is legitimate and which network traffic is being received from malicious computer systems that are launching the DDoS attack. The DDoS mitigation server forwards the legitimate network traffic to the targeted computer system and discards the network traffic being received from malicious computer systems. Once the DDoS attack terminates, the router at the DDoS protection services company withdraws the new temporary route, and the router associated with the targeted computer system advertises the previous route. As a result, the targeted computer system again receives requests for webpages and other content directly, rather than through the DDoS mitigation server.

One drawback of the above approach is that, at the time of a DDoS attack, the DDoS mitigation server may not be immediately available to mitigate the effects of the attack. In one example, and without limitation, the network address of the DDoS mitigation server could be inadvertently disclosed to, or otherwise discovered by, a malicious computer system. In such cases, the malicious computer system could initiate and launch a DDoS attack against both the targeted computer system and the associated DDoS mitigation server. As a result, neither the targeted computer system nor the associated DDoS mitigation server would be able to process network traffic directed to the targeted computer system. In another example, and without limitation, the DDoS mitigation server could be undergoing system maintenance, repair, or upgrade at the time of the attack. As a result, the DDoS mitigation server would be unavailable to provide DDoS mitigation services until the system maintenance, repair, or upgrade is complete. In the meantime, the DDoS attack would continue without abatement. In yet another example, and without limitation, the DDoS mitigation server could be experiencing an unusually heavy processing load, such as when providing DDoS mitigation for a greater than average number of computer systems. In such cases, the DDoS mitigation server would not be able to provide DDoS mitigation services for an additional targeted computer system until the processing load subsequently decreases. In all of these examples, the DDoS mitigation server would not be able to provide immediate DDoS mitigation services to the targeted system undergoing a DDoS attack. If a DDoS attack continues for a period of time without mitigation, then the targeted computer system may be rendered unable to service legitimate network traffic and, in the extreme, may be rendered completely inoperable.

As the foregoing illustrates, what is needed in the art is a more efficient way to mitigate the effects of a DDoS attack after such a DDoS attack is detected.

SUMMARY OF THE INVENTION

Various embodiments of the present application set forth a method for dynamically assigning a signaling server for threat mitigation. The method includes transmitting a first message to a first signaling server requesting first configuration data. The method further includes receiving a second message from the first signaling server that includes first configuration data identifying a second signaling server. The method further includes determining that a distributed denial of service (DDoS) attack is in progress. The method further includes, in response to determining that a DDoS attack is in progress, transmitting a third message to the second signaling server requesting mitigation of the DDoS attack.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that a DDoS detection server is automatically reassigned to a cloud signaling server based on the current state of the cloud signaling servers, such as whether certain cloud signaling server are under attack, are undergoing maintenance, or are being upgraded. In particular, if a currently assigned cloud signaling servers has a diminished capacity for providing DDoS mitigation support, then the DDoS detection server is automatically reassigned to a cloud signaling server with a relatively higher capacity for providing DDoS mitigation support. As a result, the percentage of time that the DDoS detection server is protected by the cloud signaling service is increased relative to conventional approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
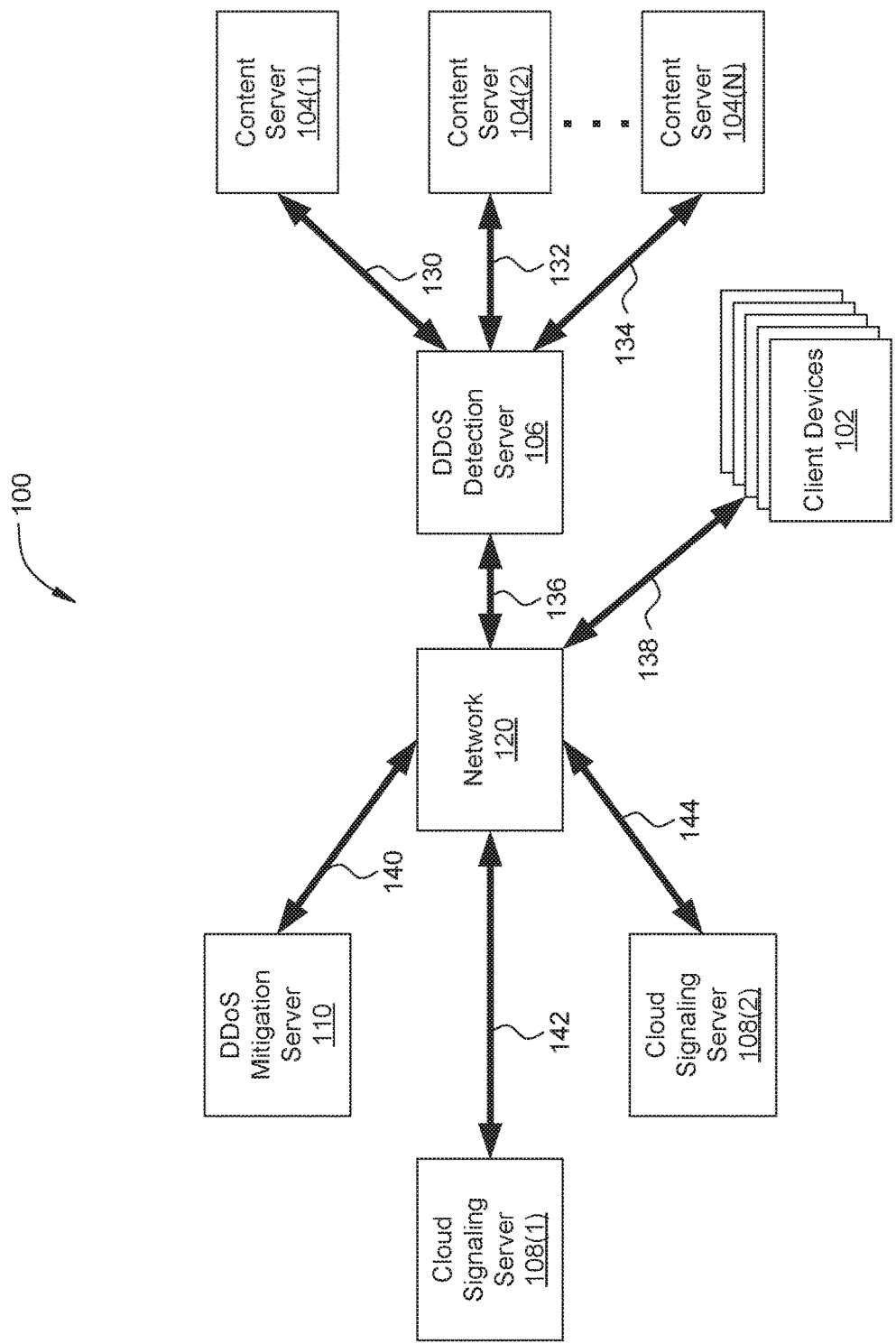
FIG. 1 illustrates a system configured to implement one or more aspects of the present invention.

FIG. 1 illustrates a system 100 configured to implement one or more aspects of the present invention. As shown, the system includes, without limitation, content servers 102(1), 102(2), . . . 102(N), a DDoS detection server 104, cloud signaling servers 106, a DDoS mitigation server 108, and client devices 110 in communication with each other via a network 120. Network 120 may be any suitable environment to enable communications among remote or local computer systems, including, without limitation, cross connect systems within a data center, dedicated low-latency networks, LANs (Local Area Networks), and internet-based WANs (Wide Area Networks).

Each of client devices 102 includes a computing device that may be a personal computer, video game console, personal digital assistant, mobile phone, mobile device, or any other device suitable for implementing one or more aspects of the present invention. Illustratively, client devices 102 communicate over network 120 via communications link 138. Client devices 102 transmit network messages that include requests for specific content from one or more of content servers 104(1), 104(2), . . . 104(N). Upon receiving the requested content from content servers 104(1), 104(2), . . . 104(N), client devices 102 perform further processing on the requested content, including, without limitation, analyzing the requested content and displaying the requested content on a display device.

Each of content servers 104(1), 104(2), . . . 104(N) includes a computing device that may be a personal computer, video game console, personal digital assistant, mobile phone, mobile device, or any other device suitable for implementing one or more aspects of the present invention. Content servers 104(1), 104(2), and 104(N) communicate with DDoS detection server 106 via communications links 130, 132, and 134, respectively. Communications links 130, 132, and 134 may be any technically feasible communication channel, including, without limitation, point-to-point communications channels, one or more LANs, and one or more internet-based WANs. In response to receiving network messages that include requests for specific content, content servers 104(1), 104(2), . . . 104(N) retrieve and transmit network messages that include the requested content to DDoS detection server 106 via communications links 130, 132, and 134, respectively.

DDoS detection server 106 includes a computing device that may be a personal computer, server, router, or any other device suitable for implementing one or more aspects of the present invention. Illustratively, DDoS detection server 106 communicates over network 120 via communications link 136. In operation, DDoS detection server 106 establishes two communications channels (not explicitly shown) through which to communicate to various other network-connected devices via communications link 136. These two communications channels are referred to herein as the data channel and the signaling channel. DDoS detection server 106 communicates via the data channel to transmit and receive standard network traffic including, without limitation, network messages that include requests for specific content and network messages that include the requested content. The data channel supports one or more protocols for bidirectional communications over a network, including, without limitation, HyperText Transfer Protocol (HTTP), JavaScript Object Notation (JSON), and Transmission Control Protocol/Internet Protocol (TCP/IP). Network message transmitted and received via the data channel may conform to any one of these protocols for bidirectional communications. DDoS detection server 106 communicates via the signaling channel to transmit and receive certain signals during a threat, such as a DDoS attack, as further described herein. The signaling channel supports one or more protocols for connectionless unidirectional communications over a network, including, such as User Datagram Protocol (UDP). Network message transmitted and received via the signaling channel may conform to this protocol for connectionless unidirectional communications.

In operation, DDoS detection server 106 communicates via the data channel to one or more client devices 102. DDoS detection server 106 receives, from one or more client devices 102, network messages that include requests for specific content. DDoS detection server 106 transmits these network messages to one or more content servers 104(1), 104(2), . . . 104(N). In response, DDoS detection server 106 receives, from one or more content servers 104(1), 104(2), . . . 104(N), network messages that include the requested content. DDoS detection server 106 transmits these network messages to the requesting client devices 102.

In addition, DDoS detection server 106 communicates via the data channel and the signaling channel to one of cloud signaling servers 108(1) and 108(2) over communications links 142 and 144 respectively. Typically, DDoS detection server 106 is configured to communicate with a particular cloud signaling server, such as cloud signaling server 108(1), at any given time. Via the data channel, DDoS detection server 106 periodically transmits network messages that include requests for configuration data to the assigned cloud signaling server 108(1). In response, cloud signaling server 108(1) transmits network messages, via the data channel, to DDoS detection server 106 that include the requested configuration data such as authentication key data. In addition, via the signaling channel, DDoS detection server 106 periodically transmits a heartbeat message to the currently assigned cloud signaling server 108 to verify that the signaling channel is still open. In response, the currently assigned cloud signaling server 108 transmits a heartbeat response back to DDoS detection server 106.

In addition, the network message transmitted by cloud signaling server 108(1) to DDoS detection server 106 may include an indication that DDoS detection server 106 is now assigned to a different cloud signaling server 108, such as cloud signaling server 108(2). In response, DDoS detection server 106 stops communicating with cloud signaling server 108(1) and begins communication with cloud signaling server 108(2). Subsequently, cloud signaling server 108(2) may transmit a network message to DDoS detection server 106 that includes an indication that DDoS detection server 106 is now assigned to a different cloud signaling server 108, such as cloud signaling server 108(1) or to a third cloud signaling server (not explicitly shown). In response, DDoS detection server 106 stops communicating with cloud signaling server 108(2) and begins communication with the newly assigned cloud signaling server 108.

If DDoS detection server 106 detects a threat, such as a DDoS attack in progress, then DDoS detection server 106 transmits a network message via the signaling channel to the assigned cloud signaling server 108. The network message includes a request to mitigate the threat and may include other information, including, without limitation, an indicator of which domain names or prefixes are under attack, the IP address of the source of the network message, and authentication data. One of cloud signaling servers 108(1) and 108(2) then responds appropriately. In some embodiments, DDoS detection server 106 may continuously transmit network messages that include mitigation requests until at least one message is acknowledged by the currently assigned cloud signaling servers 108.

Each of cloud signaling servers 108(1) and 108(2) includes a computing device that may be a personal computer, server, router, or any other device suitable for implementing one or more aspects of the present invention. Illustratively, cloud signaling servers 108(1) and 108(2) communicate over network 120 via communications links 142 and 144 respectively. In operation, cloud signaling servers 108(1) and 108(2) exchange network messages with DDoS detection server 106 as further described herein. More particularly, at any given time, one of cloud signaling servers 108(1) and 108(2) is assigned to communicate with DDoS detection server 106. The currently assigned cloud signaling server, such as cloud signaling server 108(1) can assign a different cloud signaling server, such as cloud signaling server 108(2), to DDoS detection server 106. In this manner, the cloud signaling server 108 assigned to DDoS detection server 106 can change when the currently assigned signaling server 108 undergoes a threat, such as a DDoS attack, is under maintenance, or is being upgraded. In this manner, the DDoS detection server 106 can be dynamically assigned to a cloud signaling server 108 based on the current condition of the various cloud signaling servers 108.

When cloud signaling server 108 receives a mitigation request from DDoS detection server 106, cloud signaling server 108 responds appropriately. In one example, cloud signaling server 108 could determine that the mitigation request is received from a valid source IP address with an active account. In such cases, cloud signaling server 108 would service the mitigation request by instructing DDoS mitigation server 110 to advertise a route associated with DDoS detection server 106. As a result, network traffic directed to one or more content servers 104 associated with DDoS detection server 106 would be diverted to DDoS mitigation server 110. In another example, cloud signaling server 108 could determine that the mitigation request is received from an invalid source IP address or from an IP address associated with an inactive or delinquent account. In such cases, cloud signaling server 108 would not service the mitigation request. Whether or not cloud signaling server 108 services the request, cloud signaling server 108 transmits an acknowledgement to DDoS detection server 104. In some embodiments, cloud signaling server 108 may continuously transmit network messages that include an acknowledgement until at least one message is acknowledged by DDoS detection server 106.

DDoS mitigation server 110 includes a computing device that may be a personal computer, server, router, or any other device suitable for implementing one or more aspects of the present invention. Illustratively, mitigation server 110 communicates over network 120 via communications link 140. Upon receiving an instruction to mitigate a particular DDoS attack, DDoS mitigation server 110 advertises a route associated with DDoS detection server 106. As a result, network traffic directed to one or more content servers 104 associated with DDoS detection server 106 is diverted to DDoS mitigation server 110.

Dynamic Allocation for Dissemination of Threat Information

Figure 2:
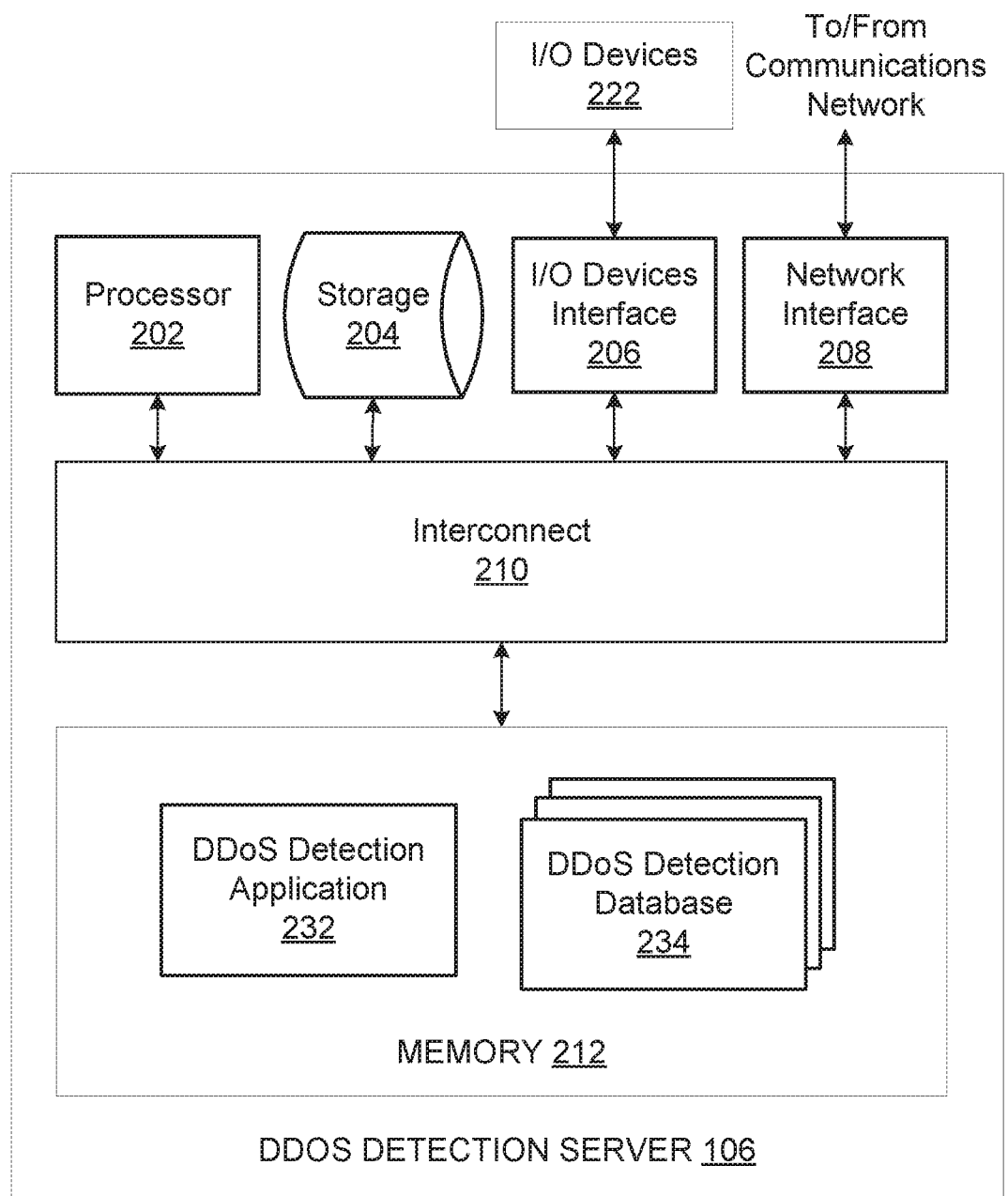
FIG. 2 is a more detailed illustration of the DDoS detection server of FIG. 1, according to various embodiments of the present invention.

FIG. 2 is a more detailed illustration of the DDoS detection server 106 of FIG. 1, according to various embodiments of the present invention. As shown, DDoS detection server 106 includes, without limitation, a central processing unit (CPU) 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, a DDoS detection application 232 and a DDoS detection database 234. The DDoS detection application 232, when executed by the processor 202, performs one or more operations associated with DDoS detection server 106 of FIG. 1, as further described herein. In operation, DDoS detection application 232 communicates via the data channel and the signaling channel to one of cloud signaling servers 108(1) and 108(2) over communications links 142 and 144 respectively. Typically, DDoS detection application 232 is configured to communicate with a particular cloud signaling server, such as cloud signaling server 108(1), at any given time. Via the data channel, DDoS detection application 232 transmits network messages that include requests for configuration data to the assigned cloud signaling server 108(1). In response, cloud signaling server 108(1) transmits network messages, via the data channel, to DDoS detection application 232 that include the requested configuration data such as authentication key data. DDoS detection application 232 stores the requested configuration data, including authentication key data in DDoS detection database 234.

In addition, the network message transmitted by cloud signaling server 108(1) to DDoS detection application 232 may include an indication that DDoS detection server 106 is now assigned to a different cloud signaling server 108, such as cloud signaling server 108(2). In response, DDoS detection application 232 stops communicating with cloud signaling server 108(1) and begins communication with cloud signaling server 108(2). Subsequently, cloud signaling server 108(2) may transmit a network message to DDoS detection application 232 that includes an indication that DDoS detection server 106 is now assigned to a different cloud signaling server 108, such as cloud signaling server 108(1) or to a third cloud signaling server (not explicitly shown). In response, DDoS detection application 232 stops communicating with cloud signaling server 108(2) and begins communication with the newly assigned cloud signaling server 108. After each change in the cloud signaling server 108 assigned to DDoS detection server 106, DDoS detection application 232 stores an identifier associated with the assigned cloud signaling server 108 in DDoS detection database 234.

If DDoS detection application 232 detects a threat, such as a DDoS attack in progress, then DDoS detection application 232 transmits a network message via the signaling channel to the assigned cloud signaling server 108. The network message includes a request to mitigate the threat and may include other information, including, without limitation, an indicator of which domain names or prefixes are under attack, the IP address of the source of the network message, and authentication data. One of cloud signaling servers 108(1) and 108(2) then responds appropriately. In some embodiments, DDoS detection application 232 may continuously transmit network messages that include mitigation requests until at least one message is acknowledged by the currently assigned cloud signaling servers 108.

Figure 3:
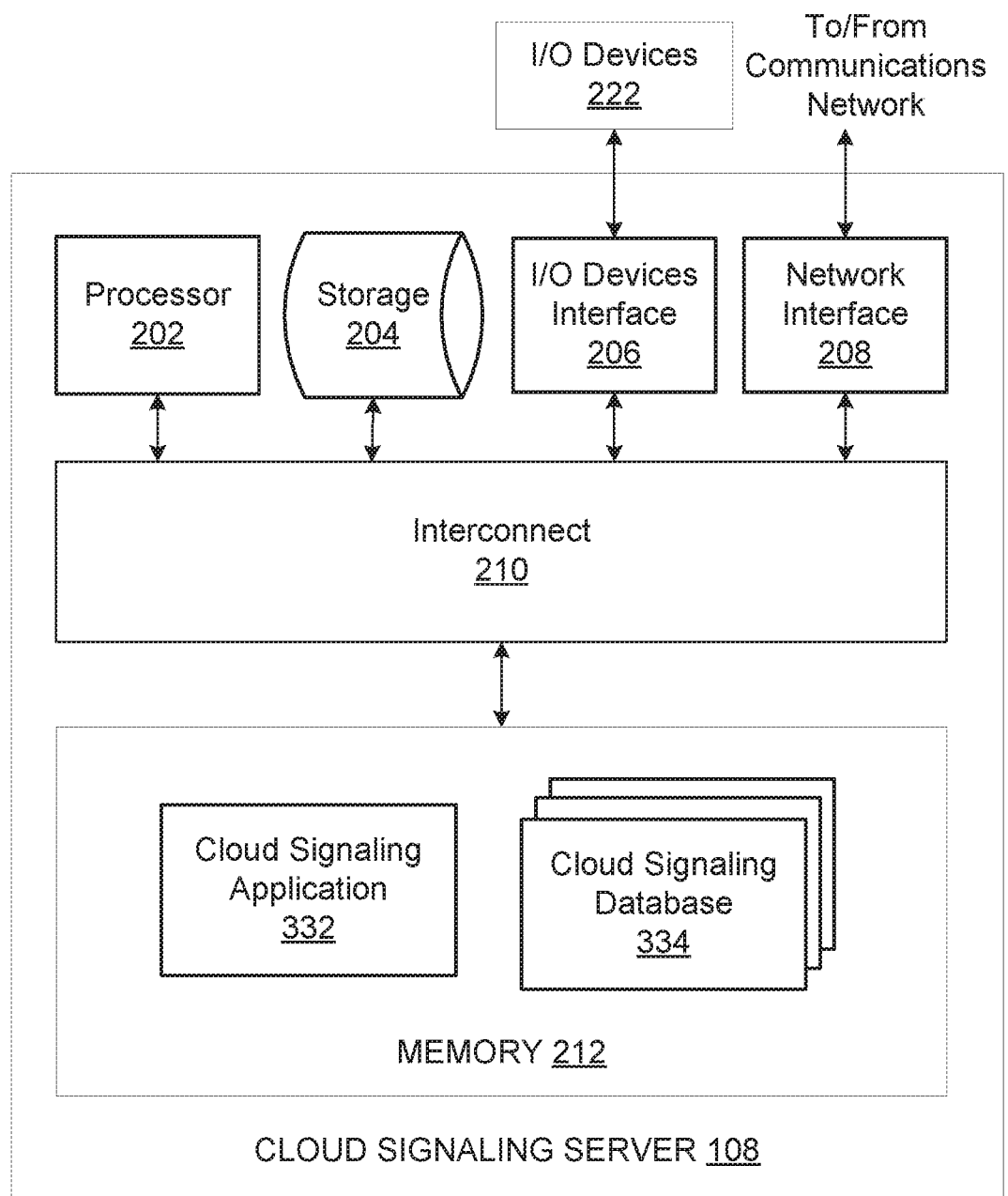
FIG. 3 is a more detailed illustration of the cloud signaling server of FIG. 1, according to various embodiments of the present invention.

FIG. 3 is a more detailed illustration of the cloud signaling server 108 of FIG. 1, according to various embodiments of the present invention. As shown, cloud signaling server 108 includes, without limitation, a central processing unit (CPU) 202, storage 204, an input/output (I/O) devices interface 206, a network interface 208, an interconnect 210, and a system memory 212. Central processing unit (CPU) 202, storage 204, input/output (I/O) devices interface 206, network interface 208, interconnect 210, and system memory 212 operate substantially the same as the corresponding elements described in conjunction with FIG. 2, except as further described below.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN).

Processor 202 communicates to other computing devices and systems via network interface 208, where network interface 208 is configured to transmit and receive data via a communications network.

The system memory 212 includes, without limitation, a cloud signaling application 332 and a cloud signaling database 334. The cloud signaling application 332, when executed by the processor 202, performs one or more operations associated with cloud signaling server 108 of FIG. 1, as further described herein. In operation, cloud signaling application 332 exchanges network messages with DDoS detection server 106 as further described herein. More particularly, at any given time, one of cloud signaling servers 108(1) and 108(2) is assigned to communicate with DDoS detection server 106. The currently assigned cloud signaling server, such as cloud signaling server 108(1) can assign a different cloud signaling server, such as cloud signaling server 108(2), to DDoS detection server 106. In this manner, the cloud signaling server 108 assigned to DDoS detection server 106 can change when the currently assigned signaling server 108 undergoes a threat, such as a DDoS attack, is under maintenance, or is being upgraded. In this manner, the DDoS detection server 106 can be dynamically assigned to a cloud signaling server 108 based on the current condition of the various cloud signaling servers 108.

When cloud signaling application 332 receives a mitigation request from DDoS detection server 106, cloud signaling application 332 responds appropriately. In one example, cloud signaling application 332 could determine, based on data stored in cloud signaling database 334, that the mitigation request is received from a valid source IP address with an active account. In such cases, cloud signaling application 332 would service the mitigation request by instructing DDoS mitigation server 110 to advertise a route associated with DDoS detection server 106. As a result, network traffic directed to one or more content servers 104 associated with DDoS detection server 106 would be diverted to DDoS mitigation server 110. In another example, cloud signaling application 332 could determine, based on data stored in cloud signaling database 334, that the mitigation request is received from an invalid source IP address or from an IP address associated with an inactive or delinquent account. In such cases, cloud signaling application 332 would not service the mitigation request. Whether or not cloud signaling application 332 services the request, cloud signaling application 332 transmits an acknowledgement to DDoS detection server 104. In some embodiments, cloud signaling application 332 may continuously transmit network messages that include an acknowledgement until at least one message is acknowledged by DDoS detection server 106.

Figure 4A:
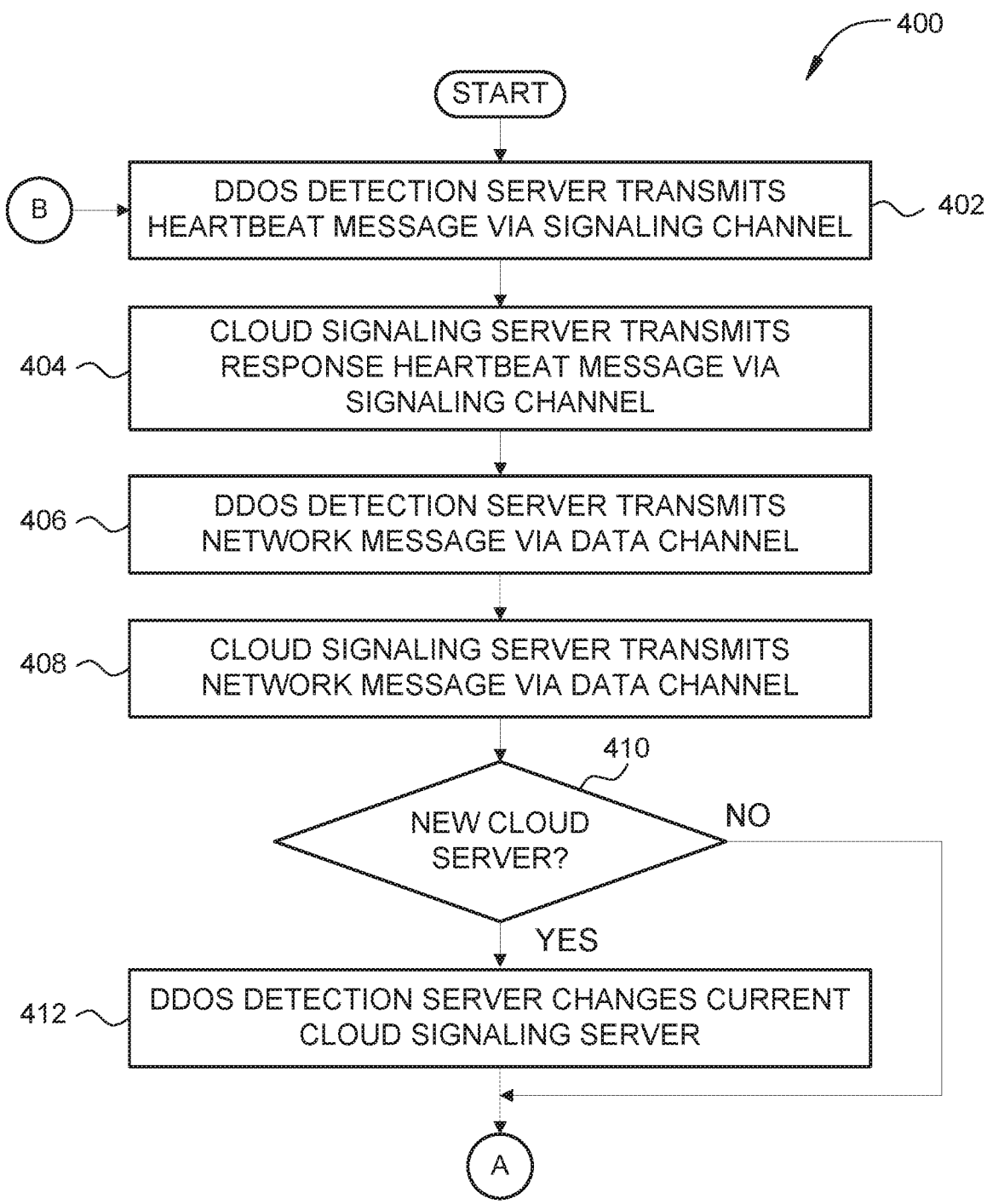
FIGS. 4A-4B set forth a flow diagram of method steps for dynamically assigning a signaling server for threat mitigation, according to various embodiments of the present invention.
Figure 4B:
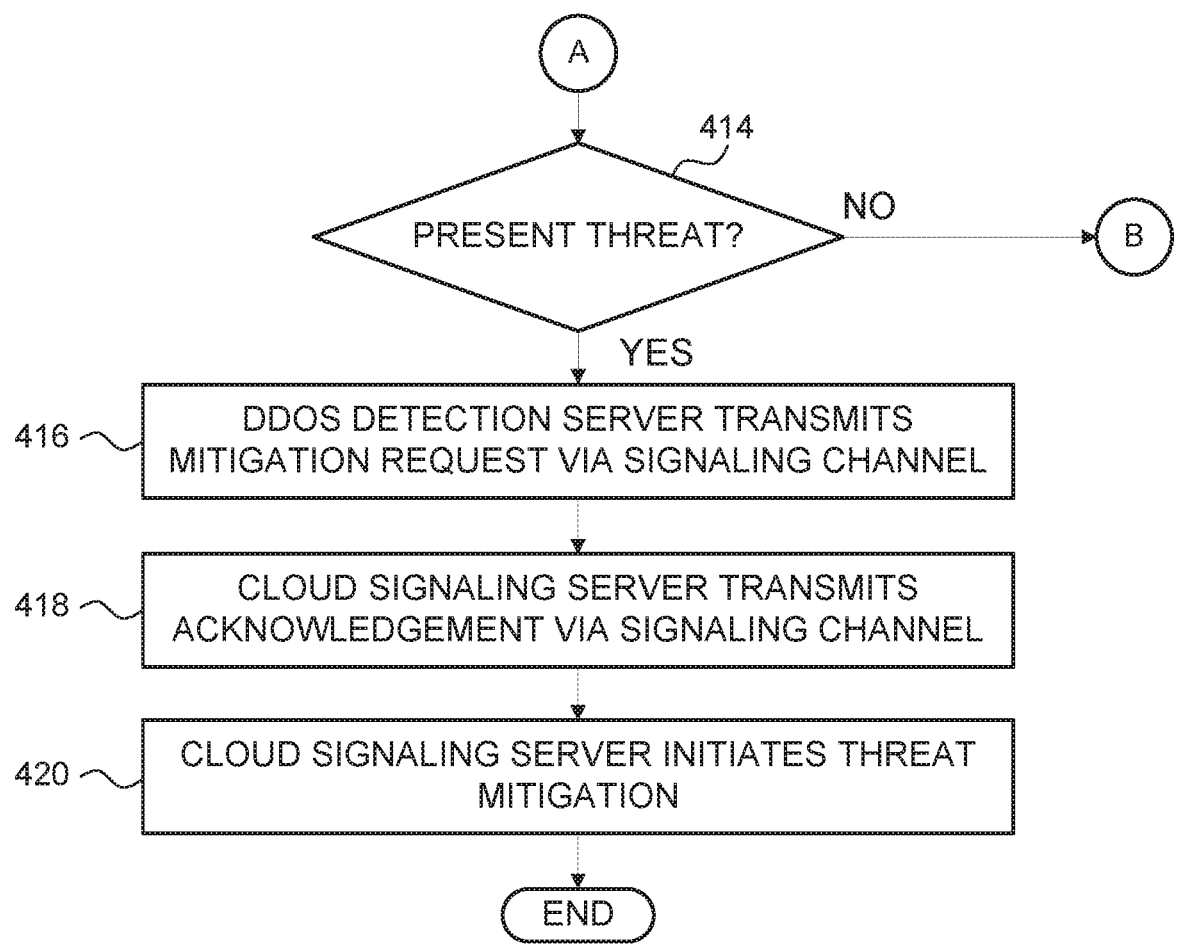

FIGS. 4A-4B set forth a flow diagram of method steps for dynamically assigning a signaling server for threat mitigation, according to various embodiments of the present invention. Although the method steps are described in conjunction with the systems of FIGS. 1-3, persons of ordinary skill in the art will understand that any system configured to perform the method steps, in any order, is within the scope of the present invention.

As shown, a method 400 begins at step 402, where DDoS detection server 106 transmits, via the signaling channel, a heartbeat message to the assigned cloud signaling server 108(1). At step 404, cloud signaling server 108(1) transmits a response heartbeat message, via the signaling channel, to DDoS detection server 106. At step 406, DDoS detection server 106 transmits, via the data channel, a network message that includes queries for configuration data to the assigned cloud signaling server 108(1). At step 408, cloud signaling server 108(1) transmits a network message, via the data channel, to DDoS detection server 106 that include the requested configuration data such as authentication key data.

At step 410, DDoS detection server 106 determines, based on the received network message, whether the cloud signaling server 108 has changed to a new cloud signaling server, such as cloud signaling server 108(2). If the cloud signaling server 108 has changed, then the method proceeds to step 412, where DDoS detection server 106 changes the currently assigned cloud signaling server 108 to cloud signaling server 108(2).

At step 414, DDoS detection server 106 determines whether there is a present threat, such as a DDoS attack. If there is no present threat, then the method proceeds to step 402, described above. If there is a present threat, then the method proceeds to step 416, where DDoS detection server 106 transmits a message, via the signaling channel, a message to the currently assigned cloud signaling server 108 requesting mitigation of the threat. In some embodiments, DDoS detection server 106 transmits the message continuously until the currently assigned cloud signaling server 108 acknowledges the message. At step 418, the currently assigned cloud signaling server 108 transmits, via the signaling channel, an acknowledgement to DDoS detection server 106. In some embodiments, the currently assigned cloud signaling server 108 transmits the acknowledgment continuously until DDoS detection server 106 acknowledges the message.

At step 420, the currently assigned cloud signaling server 108 initiates mitigation of the threat. In some embodiments, the currently assigned cloud signaling server 108 transmits an instruction to DDoS mitigation server 110. In response, DDoS mitigation server 110 advertises a route to divert traffic directed to DDoS detection server 106 to instead be directed to DDoS mitigation server 110. The method 400 then terminates.

Returning to step 410, if the cloud signaling server 108 has not changed, then the method proceeds to step 414, described above.

In sum, a DDoS detection server periodically requests and receives configuration data from a first cloud signaling server that include authorization key and other data. Further, the DDoS detection server may also receive a notification that the DDoS detection server is now assigned to a second cloud signaling server. In response, the DDoS detection server stops communication with the first cloud signaling server and starts communication with the second cloud signaling server. The DDoS detection server then periodically requests and receives configuration data from the second cloud signaling server. If the DDoS detection server detects a present threat, such as a DDoS attack, the DDoS detection server transmits a message to the currently assigned cloud signaling server with a request to mitigate the threat. The request is transmitted over a signaling channel rather than the standard data channel. The second cloud signaling server responds appropriately, such as by instructing a DDoS mitigation server to publish a route to divert network traffic away from the DDoS detection server and toward the DDoS mitigation server.

At least one advantage of the disclosed techniques is that a DDoS detection server is automatically reassigned to a cloud signaling server based on the current state of the cloud signaling servers, such as whether certain cloud signaling server are under attack, are undergoing maintenance, or are being upgraded. In particular, if a currently assigned cloud signaling servers has a diminished capacity for providing DDoS mitigation support, then the DDoS detection server is automatically reassigned to a cloud signaling server with a relatively higher capacity for providing DDoS mitigation support. As a result, the percentage of time that the DDoS detection server is protected by the cloud signaling service is increased relative to conventional approaches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for dynamically assigning a signaling server for threat mitigation, the method comprising:
   transmitting, by a first device to a first signaling server via a first signaling channel, a first signaling message;
   transmitting, by the first device to the first signaling server via a first data channel, a first data message requesting first configuration data;
   receiving, by the first device from the first signaling server via the first data channel, a second message assigning a second signaling server to the first device;
   determining, by the first device, that a first distributed denial of service (DDoS) attack is in progress; and
   in response to determining that the first DDoS attack is in progress, transmitting, by the first device to the second signaling server via a second signaling channel, a third message requesting mitigation of the first DDoS attack,
   wherein the second signaling server causes a mitigation server to divert network traffic away from the first device and to the mitigation server.

2. The computer-implemented method of claim 1, wherein first signaling server transmits the second message based on a first state of the first signaling server.

3. The computer-implemented method of claim 1, further comprising withdrawing a route that directs the network traffic to at least one content server.

4. The computer-implemented method of claim 1, further comprising:
   continuing to transmit the third message to the second signaling server; and
   receiving, by the first device from the second signaling server, a fourth message that includes an acknowledgement, wherein transmission of the third message ceases upon receiving the fourth message.

5. The computer-implemented method of claim 1, further comprising, receiving, by the first device from the second signaling server, a fourth message that includes an acknowledgement that the third message was received.

6. The computer-implemented method of claim 5, wherein the fourth message is transmitted over the second signaling channel.

7. One or more non-transitory computer-readable storage media including instructions that, when executed by one or more processors, cause the one or more processors to dynamically assign a signaling server for threat mitigation, by performing the steps of:

transmitting, by a first device to a first signaling server via a first signaling channel, a first signaling message;

transmitting, by the first device to the first signaling server via a first data channel, a first data message requesting first configuration data;

receiving, by the first device from the first signaling server via the first data channel, a second message assigning a second signaling server to the first device;

determining, by the first device, that a first distributed denial of service (DDoS) attack is in progress; and in response to determining that the first DDoS attack is in progress, transmitting, by the first device to the second signaling server via a second signaling channel, a third message requesting mitigation of the first DDoS attack, wherein the second signaling server causes a mitigation server to divert network traffic away from the first device and to the mitigation server.

8. The one or more non-transitory computer-readable storage media of claim 7, wherein at least one of the first signaling message or the second message conforms to HyperText Transfer Protocol (HTTP), JavaScript Object Notation (JSON), or Transmission Control Protocol/Internet Protocol (TCP/IP).

9. The one or more non-transitory computer-readable storage media of claim 7, wherein the second signaling channel supports a protocol for connectionless, unidirectional communications.

10. The one or more non-transitory computer-readable storage media of claim 7, wherein the third message conforms to User Datagram Protocol (UDP).

11. The one or more non-transitory computer-readable storage media of claim 7, further including instructions that, when executed by the one or more processors, cause the one or more processors to perform the steps of:

continuing to transmit the third message to the second signaling server; and receiving, by the first device from the second signaling server, a fourth message that includes an acknowledgement, wherein transmission of the third message ceases upon receiving the fourth message.

12. The one or more non-transitory computer-readable storage media of claim 7, further including instructions that, when executed by the one or more processors, cause the one or more processors to perform the step of receiving, by the first device from the second signaling server, a fourth message that includes an acknowledgement that the third message was received.

13. The one or more non-transitory computer-readable storage media of claim 12, wherein the fourth message is transmitted over the second signaling channel.

14. A computing device, comprising:

a memory that includes a DDoS detection application; and a processor that is coupled to the memory and executes the DDoS detection application to:

transmit, by the computing device to a first signaling server via a first signaling channel, a first signaling message;

transmit, by the computing device to the first signaling server via a first data channel, a first data message requesting first configuration data;

receive, by the computing device, from the first signaling server via the first data channel, a second message assigning a second signaling server to the computing device;

determine, by the computing device, that a first distributed denial of service (DDoS) attack is in progress; and in response to determining that the first DDoS attack is in progress, transmit, by the computing device to the second signaling server via a second signaling channel, a third message requesting mitigation of the first DDoS attack, wherein the second signaling server causes a mitigation server to divert network traffic away from the computing device and to the mitigation server.

15. The computing device of claim 14, wherein the processor further executes the DDoS detection application to withdraw a route that directs the network traffic to at least one content server.

16. The computing device of claim 14, wherein the processor further executes the DDoS detection application to:

continue to transmit the third message to the second signaling server; and receive, from the second signaling server, a fourth message that includes an acknowledgement, wherein transmission of the third message ceases upon receiving the fourth message.

17. The computing device of claim 14, wherein the processor further executes the DDoS detection application to receive, from the second signaling server, a fourth message that includes an acknowledgement that the third message was received.

18. The computing device of claim 14, wherein the second message further includes authorization key information.

19. The computing device of claim 14, wherein the third message further includes at least one of:

a first network address associated with the computing device, a first domain name associated with the first DDoS attack, or authentication key information.

\* \* \* \* \*